United States Patent Office 3,779,992
Patented Dec. 18, 1973

3,779,992
INTERPOLYMERIZATION OF ETHYLENE WITH OTHER VINYL MONOMERS IN AQUEOUS EMULSION
Joseph K. Liu, Pierrefonds, Quebec, Canada, and Maurice Douek, Los Angeles, Calif., assignors to Gulf Oil Canada Limited, Toronto, Ontario, Canada
No Drawing. Filed Sept. 13, 1971, Ser. No. 180,076
Int. Cl. C08f 1/13
U.S. Cl. 260—63 UY                         19 Claims

ABSTRACT OF THE DISCLOSURE

An improvement in low pressure aqueous emulsion interpolymerization of ethylene with other vinyl monomers is disclosed wherein $Mn^{+3}$ bisulfite redox initiator is used under specific conditions.

---

This invention relates to an improved process for aqueous emulsion interpolymerization of ethylene with other vinyl monomers. More particularly it relates to the use of a specific redox polymerization initiator for the aqueous emulsion interpolymerization of ethylene.

Vinyl acetate-ethylene copolymer emulsions wherein the vinyl acetate is present in major proportion in the copolymer are of great interest particularly in the field of adhesives, paints and other coating applications. Incorporation of a proportion of ethylene with vinyl acetate is an excellent method of modifying the properties of a vinyl acetate polymer provided such copolymers can be readily prepared, preferably by aqueous emulsion polymerization techniques. However the preparation of these copolymer emulsions is quite complex as during the polymerization the ethylene monomer is present in the vapor phase and has only low solubility in the liquid vinyl acetate monomer. Relatively low temperature and pressure conditions for the copolymerization are to be desired if feasible, but the copolymerization of vinyl acetate with ethylene is particularly difficult to effect and control under such conditions. Analagous copolymers of ethylene with other monomers commonly used per se in the field of coating applications, for example vinyl chloride and acrylate esters, are also of interest but difficulties are encountered in the preparation thereof which are similar to those encountered with vinyl acetate and ethylene.

In the art of aqueous emulsion polymerization many redox polymerization initiator systems are known, some being more suitable for specific purposes than others. It has been suggested broadly in, for example, French Pat. 1,396,345 that manganese compounds, wherein the manganese has a valance of at least 3 but less than 7, together with a wide variety of reducing agents can be used as initiators for vinyl polymerization. However, this disclosure and others in the art are concerned neither with polymerization in aqueous emulsion nor with the specific interpolymerization which is the subject of the instant specification. Furthermore, the disclosed redox systems utilizing manganese have not found extensive use in commercial polymerization techniques.

The present invention is based on the fact that it has been found that the particular redox system of manganic ion and a bisulfite type reducing agent, which is a completely water-soluble system, has unexpected advantages when used in the emulsion interpolymerization of ethylene with other vinyl monomers in either batch or continuous processes. This redox polymerization initiating system is apparently not suitable for the homopolymerization of ethylene and exhibits no particular advantages over more conventional redox initiators for the homopolymerization of for example vinyl acetate. However for emulsion copolymerization of ethylene with other vinyl monomer, the latter being present in major proportion, this initiator gives unexpectedly superior results. It is also equally suited to polymerizations wherein minor amounts of yet other monomers are interpolymerized with the ethylene and vinyl monomer.

Use of the aforementioned redox initiator under proper conditions enables a usefully high and readily regulated proportion of ethylene to be incorporated in the polymers at low temperature and pressure (up to 1 mole ethylene per mole other monomer) and it is possible to obtain a high degree of monomer conversion therewith. Copolymerizations under similar conditions involving ethylene but using other redox initiators, e.g. tert.-butyl hydroperoxide-sodium bisulfite, when the reaction can be sustained to any significant degree, are found to be characterized by unacceptably high residual monomer content in the product emulsion, low ethylene monomer conversion, and low levels of incorporation of ethylene into the copolymer.

The present invention thus consists of the improvement in redox initiated low pressure aqueous emulsion interpolymerization of ethylene with other vinyl monomer wherein product interpolymer is to contain 1 mole or less of ethylene per mole other vinyl monomer, said improvement comprising using as redox polymerization initiator system manganic ion as oxidizing component thereof and a member of the group of alkali metal bisulfites and metabisulfites as reducing component thereof, and carrying out the polymerization at a temperature between about 0° C. and 45° C. and at a pH of about 3 to 7.

Broadly the emulsion interpolymerization of ethylene with vinyl monomer can be carried out using known batch or continuous techniques utilizing delayed addition of ingredients and adapted, of course, to pressure operation. An example of continuous operation which is highly suited to the present process and is the preferred method is disclosed in U.S. Pat. 3,551,396 of R. Lanthier. Details relating to batch or continuous operation will be elaborated upon in the disclosures to follow.

As to the redox initiator components for use according to the present invention, trivalent manganese compounds are generally not water soluble and in any case the manganic ion is not very stable in aqueous solution. A solution containing manganic ion can be prepared for example by utilizing a water soluble manganous compound and potassium permanganate in acid medium, according to the following reaction:

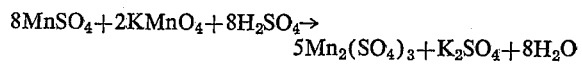
$8MnSO_4 + 2KMnO_4 + 8H_2SO_4 \rightarrow$
$5Mn_2(SO_4)_3 + K_2SO_4 + 8H_2O$ However, at any pH greater than about 3 the manganic ion does not remain as such in aqueous solution but tends to precipitate as a hydroxide or to disproportionate to $Mn^{+2}$ and $Mn^{+4}$, the latter precipitating as $MnO_2$. Thus it is necessary to employ a complexing or sequestering agent, which may be incorporated in the acidic aqueous solution containing the manganous salt and the potassium permanganate, to maintain the manganese in solution as the trivalent ion. An example of a suitable complexing agent is a water soluble pyrophosphate, for instance, sodium pyrophosphate. The preparation of such a complex of trivalent manganese is described in J.C.S. (1953) at p. 442 in an article by A. Y. Drummond and W. A. Waters. Other known complexing agents may be used provided they are not oxidized by trivalent manganese, which is a strong oxidizing agent and will react with many known complexing agents for example ethylenediaminetetraacetic acid. The trivalent manganese does not, at least during the period of time required for polymerization, oxidize the monomers with which the present invention is concerned. The concentration of complexing agent will of course depend on the concentration of manganic ion and the stoichiometric proportion required for formation of the complex. In the case of sodium pyrophosphate an excess may suitably be used as the pyrophosphate may also act as buffer during the polymerization reaction.

The amount of manganic ion suitable for use as one of the initiator components will depend to some extent on the temperature at which the polymerization is carried out and the proportion of ethylene it is desired to incorporate into the polymer. Generally, however, the amount will be in the range of about 0.01% to 0.2%, calculated as manganic ion, by weight of total monomers, preferably 0.05% to 0.15% by weight of total monomers.

The reducing component of the redox polymerization initiator system used according to the present invention may be any of the alkali metal bisulfites or metabisulfites, e.g. sodium bisulfite. In the production of free radicals which initiate polymerization the bisulfite type reducing agent and the manganic ion react on an equimolar basis. However during the course of the polymerization it is preferred that a substantial excess of reducing agent to manganic ion be maintained throughout in order to offset the inhibitory effects of even very small amounts of oxygen in the system. As usually the concentration of manganic ion will be very low the effects of the presence of oxygen, which can react with manganic ion as well as with the reducing agent, can be quite pronounced. Under most operating conditions the maintenance of a molar ratio of reducing agent to manganic ion of about 4 or 5 to 1 is preferred although this can of course be readily decreased or increased as required.

The redox initiator according to the present process for emulsion copolymerization of vinyl monomer with ethylene is only suitably used at a pH of 3 to 7. At alkaline pH the initiator decomposes too rapidly to obtain useful copolymerizations. When vinyl acetate or other ester is one of the monomers being utilized, the pH should not be too low, as is well known, or hydrolysis of the ester groups may occur. The preferred range of pH for the present process is 5.5 to 6.5. Any suitable water-soluble buffer salts which are well known in the art may be used to maintain the proper pH during polymerization. As has been pointed out previously herein, sodium pyrophosphate used as the complexing agent for the manganic ion may also act as buffer during the polymerization reaction.

The temperature at which the polymerization should be carried out will be in the range of about 0° C. to 45° C. At temperatures higher than 45° C. sustained interpolymerizations are not obtained as the redox initiator system is too active and decomposes far too rapidly even for the requirements of a continuous process such as disclosed in U.S. Pat. 3,551,396 to which reference has already been made herein. With low proportions of ethylene, temperatures down to about 0° C. may be employed although with higher proportions of ethylene temperatures this low will not be most suitable. The preferred temperature range is 15 to 35° C. with optimum at about 20° C.

The monomers in major proportion with which ethylene is interpolymerized according to the present process are those commonly used in either homopolymers or copolymers for coating applications. These include the vinyl monomers, for example vinyl acetate and higher vinyl esters, alkyl acrylates and methacrylates, styrene and $\alpha$-substituted styrenes, acrylonitrile, and vinyl chloride, alone or in mixtures as known in the art. It is also intended that the claimed invention is to include interpolymerizations involving minor amounts of monomers for modification purposes in addition to the ethylene. Such desired modification may be for instance for cross-linking purposes. Examples of such modifying monomers are diacetone acrylamide, alpha-olefins higher than ethylene, and divinyl esters e.g. divinyl adipate.

The manganic redox initiator used according to the present process is a completely water-soluble ssytem and is characterized by very rapid rate of production of initiating free radicals in the aqueous phase; it may be preferred when utilizing monomers of a high degree of water insolubility for example acrylates with the ethylene, to employ additionally a small amount of a monomer-soluble initiator e.g. organic peroxide or hydroperoxide to ensure acceptably low levels of residual vinyl monomer in the product emulsion. In the absence of manganic ion these monomer-soluble initiators, when used with a reducing agent as a redox system are unsatisfactory for the interpolymerization of ethylene, as previously indicated herein. Suitable proportions of monomer-soluble initiators used in conjunction with the redox system utilized according to the present invention are about 0.25% to 0.5% by weight total monomers.

Emulsifiers and stabilizers may be used with the process of the present invention although there is no criticality, as far as the invention in essence is concerned, to such use or to specific materials within these classes. Nonionic or ionic emulsifiers may be used and examples of suitable ones are the polyoxyethylene-polyoxypropylene copolymer emulsifiers known as Pluronics, nonylphenoxypoly(ethyleneoxy)ethanol and sodium dihexyl- and dioctylsulfosuccinates. Examples of suitable stabilizers are the partially hydrolyzed polyvinyl acetates. There are of course many others that may be used which are known to those skilled in the art of emulsion polymerization.

The manner of addition of reactants to the polymerization reaction is generally not critical except that it is evident of course that the components of the redox initiator must be added as separate feeds. Conventionally in polymerization "delayed addition" of any amount of a particular ingredient means addition thereof to the polymerization over a period of time as opposed to being added at once in total quantity to the polymerization medium. Thus in the continuous process disclosed in U.S. Pat. 3,551,396 referred to previously herein, addition of all ingredients is on a continuous delayed basis by the nature of the process itself. This is illustrated in the examples of the present specification as applied to the preparation of ethylene containing polymers by emulsion of polymerization.

In batch operations, addition of all ingredients may be delayed i.e. added over a period of time to the reaction medium. Another mode of batch operation is where the reducing component of the redox initiator is wholly or partially present in the initial charge, the manganic oxidizing component being added thereto over a period of time. It is not suitable however with this particular redox initiator to utilize the manganic oxidizing agent in the initial charge with delayed addition of reducing agent. In a batch operation some of the vinyl monomer to be interpolymerized with ethylene, perhaps 10% or more of the total quantity, may be present in the initial charge to which the remaining reactants are added over a period of time. However, in order to achieve good control of the polymerization reaction it is preferable that a large amount of this vinyl monomer not be present in the initial charge. Surfactants or stabilizers may be present in the initial charge partially or wholly or added partially or wholly by delayed addition.

As to addition of ethylene monomer, the process according to the present invention is concerned mainly with low pressure operation i.e. of the order of 500 p.s.i.g. or less although higher pressures may be used. The preferred range is 100–500 p.s.i.g. In a batch operation the autoclave is pressurized with ethylene gas to a predetermined level which depends on the amount of ethylene it is desired to incorporate into the polymer. A continuous stream of ethylene to the reactor during the polymerization is then used to maintain the pressure. In continuous processes in which the reactor is a closed system, e.g. as disclosed in aforementioned U.S. Pat. 3,551,396, the pressure level may be attained by liquid pressure and ethylene feed added as a continuous stream. It is preferred in this type of operation to pressurize the reactor with ethylene to the desired level prior to starting the polymerization to ensure that ethylene will enter the reaction as soon as polymerization begins. Once the reactor is pressurized a continuous feed of ethylene gas is started. With this type of reactor the ethylene may be introduced as a separate feed or may be premixed with liquid reactants in a gas disperser as illustrated in the examples of this specification.

Given the redox initiator utilized in the present process and the conditions of temperature and pressure suitable therefor, one skilled in the art would not expect any homopolymerization of ethylene to occur. It has been shown during development of the process of the present invention that when ethyl acetate is substituted for vinyl acetate monomer under the conditions described in the following examples, no polymerization occurs, i.e. homopolymerization of ethylene does not, in fact, take place. Additionally, nuclear magnetic resonance (NMR) analysis of copolymers formed by the process according to the present invention showed no evidence of formation of ethylene homopolymer. Thus, measured consumption of ethylene under the conditions of the present process represents reaction of ethylene entirely in copolymerization.

The eaxmples to follow are to be taken as illustrative of the invention but not as limiting to the scope thereof.

A stock solution containing manganic ion was prepared as follows (Drummond, A, and Waters, W., J. Chem. Soc., 440 (1953)): 123.2 grams of sodium pyrophosphate ($Na_4P_2O_7 \cdot 10H_2O$) were dissolved in 800 ml. water. 6.91 grams manganese sulfate ($MnSO_4 \cdot H_2O$) were dissolved in 40 ml. water. These two solutions were then mixed and acidified with 20% sulfuric acid to a pH of 6.0. A third aqueous solution was then prepared by dissolving 1.632 grams of potassium permanganate in 136 ml. water and then added to the mixture of the first two solutions. 11.5 ml. of the final solution was found to react completely with 55 mg. of sodium bisulfite to give a colorless solution; thus the concentration of the solution was calculated to be 0.046 molar with respect to trivalent manganese. This solution was then diluted with appropriate amounts of water when lower concentrations were required.

EXAMPLE 1

The aqueous emulsion copolymerization of ethylene with vinyl acetate according to the present invention was carried out using the continuous polymerization process disclosed in U.S. Pat. 3,551,396 of R. Lanthier.

The apparatus consisted mainly of a positive displacement Moyno (trademark) pump (Type SST size 2L3) and a length of 14 feet of 7/16" internal diameter type 316 stainless steel tubing connected to the inlet and outlet of the pump to form a substantially closed loop; a T-joint in the loop near the connection to the pump inlet permitted material to flow from the loop to an overflow vessel as additional material was fed to the loop system. A back pressure regulator was situated between the T-joint and the overflow vessel in order to maintain a positive pressure below a predetermined level at this point in the closed loop. Product from the overflow vessel was allowed to flow to a trap for separation of any gas from the product emulsion. The major portion of the length of the reactor tubing was enclosed by a cooling jacket with inlet and outlet for a flow of cooling water. The liquid holding capacity of the pump and tubing was two litres. Ethylene feed was introduced via a gas flow rate meter into a gas disperser to provide good dispersion of ethylene with liquid feeds prior to entry thereof into the loop at a point downstream of the Moyno pump outlet. Two liquid feed reservoirs were connected through appropriate tubing and controlled volume pumps, each of 200 ml./min. capacity, to the gas disperser for introduction thereto of vinyl acetate monomer solution and one component of the redox initiator in aqueous solution. A third liquid feed reservoir was connected via tubing and a controlled volume pump to the inlet of the Moyno pump. Thermocouples were used to measure the temperature of the material in the loop. The pump and loop were first filled to capacity with water and the pump started and operated at 800 r.p.m. throughout the polymerization procedure, thereby ensuring rapid recirculation of the emulsion through the loop. The reactor was pressurized to 200 p.s.i.g. by introducing ethylene via the reactor overflow and T-joint and then this flow of ethylene was discontinued. Ethylene feed via the gas disperser was then started and maintained at a rate of 3.5 grams/minute (27.3% by weight total monomer feed). Simultaneously liquid feeds were started and maintained at the following rates:

(1) Vinyl acetate at 9.3 grams per minute (10 ml./min.) via the gas disperser, (2) 6 ml./min. stock $Mn^{+3}$ solution (0.12% $Mn^{+3}$ by weight total monomer feed) via the gas disperser, and (3) Direct to the inlet of the Moyno pump at a rate of 6 ml./min., an aqueous solution containing 1 part by weight of water, 0.08 part by weight of Pluronic F–68 (trademark) emulsifier, a polyoxyethylene-polyoxypropylene copolymer emulsifier of approximate molecular weight 8750 containing about 80% by weight polyoxyethylene, and 0.024 part by weight sodium bisulfite (molar ratio $NaHSO_3:Mn^{+3}$ of 4.6:1).

When feed of the foregoing materials was started, polymerization began and the temperature of the contents of the loop began to rise. It was thereafter maintained at a level of 20° C. by circulation of water in the jacket surrounding the tubing portion of the reactor. Continuous feed of materials to the loop and withdrawal of product was carried out for a period of about 7 hours before a sample of emulsion was taken for analysis. Thus, before samples were taken, ample time had been allowed for steady state conditions to be attained. The residual vinyl acetate monomer content of the product copolymer emulsion was 0.36% by weight of emulsion and the total solids content was 51.0% by weight. The ethylene content of the copolymer was determined to be 23.9% by weight by NMR analysis.

EXAMPLES 2–5

To the apparatus described in Example 1 was added a flowmeter (type 802, American Meter Co.) connected to the gas outlet of the overflow trap for volume measurement of unreacted ethylene from the loop reactor. The general procedure of Example 1 was repeated; however the reactor was pressurized to 440 p.s.i.g. with ethylene rather than 200 p.s.i.g. Four different feed rates of ethylene to the reactor were utilized for the four examples respectively, vis. 3.8 grams/minute (7.6% by weight of total monomer feed), 5.4 g./min (10.4% by weight total monomer feed), 7.3 g./min. (13.6% by weight total monomer feed), and 9.5 g./min. (17.0% by weight total monomer feed). In all cases the liquid feeds were as follows:

(1) Vinyl acetate at 46.5 g./min. (50 ml./min.), (2) 25 ml./min. stock $Mn^{+3}$ solution diluted to two-thirds concentration with water (0.087 $Mn^{+3}$ by weight total monomer feed), and (3) 25 ml. per minute of an aqueous solution containing 1 part by weight water, 0.08 part by weight Pluronic F–68 emulsifier, and 0.02 part by weight sodium bisulfite (molar ratio $NaHSO_3:Mn^{+3}$ of 5.7:1).

The temperature of polymerization was in the range 31–36° C. and polymerization was carried out in each case for about 2 hours prior to emulsion sampling. The residual vinyl acetate in the product copolymer emulsions amounted to 1.5%, 1.4%, 1.3%, and 0.8% respectively by weight of emulsion. The copolymer emulsions contained 55.5%, 54.5%, 55.7%, and 55.5% total solids respectively by weight of emulsion. The ethylene conversions, by measurement of ethylene consumption in the loop reactor, were 97%, 96%, 96% and 94% respectively, giving calculated ethylene contents of 7.5, 10.3, 13.4 and 16.4% by weight in the copolymers.

EXAMPLE 6

The general procedure of Example 1 was repeated but the reactor was pressurized to 240 p.s.i.g. with ethylene. Ethylene feed via the gas disperser was maintained at a rate of 5.0 grams per minute (11.8% by weight total monomer feed). The liquid feeds were introduced in the same manner as in Example 1 and were as follows:

(1) Vinyl acetate at 37.2 grams per minute,
(2) An aqueous solution of stock trivalent manganese solution diluted to two-thirds concentration with water (0.08% $Mn^{+3}$ by weight total monomer feed) and containing 0.04 part by weight Pluronic F–86 emulsifier, the feed rate of the solution being 20 ml. per minute, and
(3) At a rate of 20 ml. per minute, an aqueous solution containing 1 part by weight of water, 0.04 part by weight of Gelvatol 20:90 (trademark) stabilizer, a partially hydrolyzed polyvinyl acetate containing about 20% residual polyvinyl acetate and having a viscosity in 4% aqueous solution at 20° C. of 35 to 45 centipoises, and 0.018 part by weight of sodium bisulfite (molar ratio ($NaHSO_3:Mn^{+3}$ of 5.3:1)).

The temperature of polymerization was 33° C. and an operational period of about 2 hours was allowed to pass prior to sampling product emulsion for analysis. Residual vinyl acetate monomer content in the product copolymer emulsion was 0.38% by weight of emulsion, the total solids content was 52.8% by weight of emulsion and the viscosity was 6 poises (Brookfield, 23° C., No. 3 spindle, 20 r.p.m.). The measured consumption of ethylene was 99% giving a calculated ethylene content in the copolymer of 11.8% by weight.

EXAMPLE 7

(A) The general procedure of Example 1 was repeated; however in this instance the loop portion of the reactor consisted of a length of 14 feet of 1 3/16″ internal diameter type 316 stainless steel pipe. Thus the total volume of the reactor was increased to 3.15 litres. The reactor was pressurized to 260 p.s.i.g. with ethylene. The feed rate of ethylene via the gas disperser was 6.0 grams per minute (13.9% by weight total monomer feed) and the liquid feeds were as follows:

(1) 37.2 grams per minute vinyl acetate,
(2) 20 ml. per minute of stock trivalent manganese solution diluted to two-thirds concentration with water (0.08% $Mn^{+3}$ by weight total monomer feed), and
(3) 20 ml. per minute of an aqueous solution consisting of 1 part by weight water, 0.048 part by weight Gelvatol 20:90 stabilizer and 0.016 part by weight sodium bisulfite (molar ratio $NaHSO_3:Mn^{+3}$ of 4.7:1).

The temperature of polymerization was 35° C. and a period of about 3½ hours was allowed for steady state conditions to be reached. Residual vinyl acetate monomer content in the product copolymer emulsion was 0.34% by weight of emulsion. The total solids content of the emulsion was 55.8% by weight of emulsion, and the viscosity 16.9 poises (Brookfield, 23° C., No. 3 spindle, 20 r.p.m.). The measured ethylene conversion was 95%; apparent (calculated) ethylene content in the copolymer was 13.4% by weight.

(B) A comparison run, using the general procedure and apparatus of part (A) of this example, was carried out with, instead of the trivalent manganese-bisulfite redox initiator, a redox initiator consisting of tertiary-butyl hydroperoxide with sodium bisulfite used in proportions found to be highly satisfactory for the emulsion polymerization of, for example, vinyl acetate using the same continous polymerization technique and similar temperature conditions. The reactor was pressurized to 260 p.s.i.g. with ethylene. The feed rate of ethylene via the gas disperser was initially 6.7 grams per minute, a value calculated to give 15% by weight ethylene in the product polymer assuming successful copolymerization. The reactor was initially filled with a 2% aqueous solution of Pluronic F–68 emulsifier and the liquid feeds to the reactor were as follows:

(1) 40 ml. per minute of a solution of 0.0036 part by weight tertiary-butyl hydroperoxide in 1 part by weight vinyl acetate, and
(2) 36 ml. per minute of a solution of 0.03 part by weight Pluronic F–68 emulsifier, 0.0068 part by weight sodium bisulfite, and 0.0068 part by weight disodium hydrogen phosphate in 1 part by weight water.

Initiation of polymerization occurred but the reaction generally proceeded very poorly and the selected polymerization temperature of 35° C. could not be sustained by heat of polymerization; the temperature dropped repeatedly whereas with successful polymerization cooling would be required to maintain the temperature at 35° C. The ethylene feed rate was decreased to 2.8 grams but no improvement in the reaction was observed and therefore the run was discontiued after about 50 minutes of operation.

Thus the foregoing example illustrates by direct comparison the superior results obtained by use of the manganic ion-bisulfite redox initiator according to the present invention.

EXAMPLE 8

The general procedure of Example 1 was repeated, the liquid holding capacity of the pump and tubing being 3.15 litres. The pump and loop were, however, first filled to capacity with an aqueous vinyl acetate-ethylene copolymer emulsion similar to that being prepared. The reactor was pressurized with ethylene to 290 p.s.i.g. Ethylene feed via the gas disperser was maintained at a rate of 7.5 grams per minute (13.9% by weight total monomer feed). The liquid feeds consisted of (1) 46.5 grams per minute vinyl acetate,
(2) 10 ml. per min. stock trivalent manganese solution (0.05% $Mn^{+3}$ by weight total monomer feed), and
(3) 30 ml. per minute of an aqueous solution of 0.08 part by weight Gelvatol 20:60 (trademark) stabilizer, a partially hydrolyzed polyvinyl acetate having approximately 20% residual polyvinyl acetate and having a viscosity in 4% aqueous solution at 20° C. of 21 to 25 centipoises, 0.005 part by weight Aerosol OT (trademark), a sodium dioctylsulfosuccinate emulsifier sold by American Cyanamid, and 0.016 part by weight of sodium bisulfite in 1 part by weight water (molar ratio $NaHSO_3:Mn^{+3}$ of 9.1:1).

The temperature of polymerization was maintained at 43° C. and a period of time of operation of about three hours was allowed for steady state conditions to be reached prior to emulsion sampling. Residual vinyl acetate monomer content in the product copolymer emulsion was 2.68% by weight of emulsion. The total solids content of the emulsion was 54.6% by weight and the viscosity 37 poises (Brookfield, 23° C., spindle No. 3, 20 r.p.m.). The measured ethylene conversion was over 95%; apparent (calculated) ethylene content in the copolymer was about 13.9% by weight.

EXAMPLE 9

The apparatus used was as described in Example 1 but with the modification indicated in Example 7 giving a reactor volume of 3.15 litres. Also a feed line and measuring device for introduction of liquid vinyl chloride monomer via the gas disperser into the polymerization reactor were added. The reactor was pressurized to 240 p.s.i.g. with ethylene. Ethylene feed rate via the gas disperser was maintained at 6 grams per minute (13.3% by weight total monomer feed), (1) 33.5 grams per minute vinyl acetate, (2) 5.5 grams per minute vinyl chloride (12.2% by weigth total monomer feed), (3) 24 ml. per minute of stock trivalent manganese solution diluted to four-sevenths concentration with water (0.08% $Mn^{+3}$ by weight total monomer feed), and (4) 20 ml. per minute of a solution of 0.08 part by weight Igepal CO-850 (trademark) emulsifier, a nonylphenoxypoly(ethyleneoxy) ethanol emulsifier sold by General Aniline & Film Corporation, and 0.016 part by weight sodium bisulfite in 1 part by weight of water (molar ratio $NaHSO_3:Mn^{+3}$ of 4.5:1).

The temperature of polymerization was maintained at 35° C. and a period of operation of about three hours elapsed prior to emulsion sampling. Residual vinyl acetate monomer content of the product terpolymer emulsion was 2.06% by weight of emulsion and the total solids content was 49.5% by weight. The ethylene conversion was measured as over 95%; thus the apparent (calculated) ethylene content of the vinyl acetate/vinyl chloride/ethylene terpolymer was about 13.3% by weight.

EXAMPLE 10

The product was carried out generally as described in Example 1. The reactor was pressurized with ethylene to 240 p.s.i.g. Ethylene feed rate via the gas disperser was maintained at 3 grams per minute (11.5% by weight total monomer feed). Liquid feeds consisted of (1) 0.056 part by weight diacetone acrylamide dissolved in 1 part by weight vinyl acetate (4.7% diacetone acrylamide by weight total monomer feed), feed rate 23.2 grams per minute, (2) 11 ml. per minute of stock trivalent manganese solution diluted to two-thirds concentration with water (0.07% $Mn^{+3}$ by weight total monomer feed), and (3) 11 ml. per minute of a solution of 0.08 part by weight Pluronic F-68 emulsifier and 0.016 part by weight sodium bisulfite in 1 part by weight of water (molar ratio $NaHSO_3:Mn^{+3}$ of 4.6:1).

The temperature of polymerization was maintained at 25° C. and a period of operation of about 3½ hours allowed to elapse prior to emulsion sampling. Residual vinyl acetate monomer content of product terpolymer emulsion was 1.2% by weight of emulsion and the total solids content 54.8% by weight. The ethylene conversion was measured to be 96%; the apparent (calculated) ethylene content of the vinyl acetate/ethylene/diacetone acrylamide terpolymer was 11.3% by weight.

EXAMPLE 11

The procedure was as described in Example 1. The reactor was pressurized with ethylene to 120 p.s.i.g. Ethylene feed rate via the gas disperser was maintained at 2.5 grams per minute (5.1% by weight total monomer feed). The liquid feeds consisted of:

(1) 46.5 grams per minute of a solution of 0.05 part by weight n-tetradecene-1 dissolved in 1 part by weight vinyl acetate (4.5% tetradecene-1 by weight total monomer feed), (2) 22 ml. per minute stock trivalent manganese solution diluted to two-thirds concentration with water (0.08% $Mn^{+3}$ by weight total monomers), and (3) 22 ml. per minute of a solution of 0.08 part by weight Pluronic F-68 emulsifier and 0.013 part by weight sodium bisulfite in 1 part by weight of water (molar ratio $NaHSO_3:Mn^{+3}$ of 3.7:1).

The temperature of polymerization was maintained at 35° C. and a period of operation of about 2 hours allowed to elapse prior to emulsion sampling. Residual vinyl acetate and tetradecene-1monomer content of the product terpolymer emulsion was 2.3% by weight of emulsion. The total solids content of the emulsion was 51.5% by weight. Measured ethylene conversion was over 95%; apparent (calculated) ethylene content of the vinyl acetate/ethylene/tetradecene-1 terpolymer was about 5.1% by weight.

EXAMPLE 12

The aqueous emulsion copolymerization of ethylene with vinyl acetate according to the present invention was carried out by a batch procedure. A 1-litre polymerization autoclave fitted with a mechanical stirrer was initially charged with 50 ml. of a 2% aqueous solution of Gelvatol 20:60 stabilizer. The autoclave was purged with nitrogen gas for about 25 minutes and then pressurized with ethylene to 400 p.s.i.g., this ethylene pressure being maintained throughout the subsequent polymerization by a feed stream of ethylene. Agitation was started and the stirrer speed maintained thereafter at 250 r.p.m. Simultaneous introduction of separate liquid feeds to the autoclave was started, the feed solutions consisting of:

(1) 5 mil. per minute (4.65 grams per minute) of vinyl acetate, (2) 2.4 ml. per minute of stock trivalent manganese solution diluted to two-thirds concentration with water, and (3) 2.9 ml. per minute of a solution of 13.6 parts by weight Gelvatol 20:60 stabilizer and 2 parts by weight sodium bisulfite in 170 parts by weight of water, the pH of the solution having been adjusted to 5.8 by addition of a concentrated aqueous solution of disodium hydrogen phosphate.

The temperature of the autoclave contents started to rise as polymerization commenced and was thereafter maintained at 34° C. by means of a cooling water bath surrounding the autoclave. The polymerization reaction proceeded smoothly without difficulty. Feeds of solutions (1) and (3) were discontinued after one hour but feed of solution (2) was continued for an additional 20 minutes. The ethylene pressure in the autoclave was then released. The amount of manganic ion component of the redox initiator used was 0.12% $Mn^{+3}$ by weight of vinyl acetate monomer feed and the sodium bisulfite component was used in a molar ratio to $Mn^{+3}$ of 4.1:1. The product copolymer emulsion contained 0.57% residual vinyl acetate monomer by weight of emulsion and 38.4% total solids by weight of emulsion. The ethylene content of the copolymer was determined to be 11% by weight (±1.5%) by measurement of glass transition temperature (Tg) of a film formed from the copolymer using an EDL Ball Rebound Tester (calibrated according to ethylene content of vinyl acetate/ethylene copolymers determined by NMR).

EXAMPLE 13

A batch polymerization was carried out as described in Example 12. The composition of the initial charge and of the feed solutions were the same as used in Example 12. The ethylene pressure in the autoclave was maintained at 450 p.s.i.g., the stirrer speed at 500 r.p.m., and the temperature of polymerization at 35° C. Liquid feeds (1), (2), and (3) to the autoclave were maintained at 2.5 ml. per minute, 1 ml. per minute, and 1 ml. per minute respectively for one hour. Liquid feed (1) was discontinued for a period of ½ hour, then resumed for a further 40 minutes, feed of solutions (2) and (3) however, being continued throughout. Liquid feed (1) was then discontinued but feed of (2) and (3) continued for another 15 minutes, at which point the ethylene pressure was released. The polymerization reaction had proceeded without difficulty. The amount of manganic ion component of the redox initiator used was 0.10% $Mn^{+3}$ by weight of vinyl acetate monomer feed and the sodium bisulfite component was used in molar ratio to $Mn^{+3}$ of 3.4:1. After defoaming, the product emulsion was sampled and analyzed. The residual vinyl acetate monomer was found to be 0.5% by weight of copolymer emulsion, and the total solids content 40.1% by weight of emulsion. The ethylene content of the copolymer was found to be 17% (±1.5%) by weight as determined by measurement of glass transition temperature (Tg) of polymer film cast from the emulsion. In this and all the preceding examples the pH of the product emulsions was in the range of 5.6 to 6.0.

EXAMPLE 14

This example illustrates the emulsion copolymerization of ethylene with butyl acrylate according to the process of the present invention. The polymerization was carried out in the continuous manner described in Example 7. The pump and loop were first filled to capacity with water containing 2% by weight of Pluronic F-68 emulsifier. The reactor was pressurized to 230 p.s.i.g. with ethylene. The feed rate of ethylene via the gas disperser was 3 grams per minute (7.7% by weight total monomer feed) and the liquid feeds were as follows:

(1) 35.9 grams per minute n-butyl acrylate (containing 0.5% by weight tert.-butyl hydroperoxide), (2) 5.8 ml. per minute of stock trivalent manganese solution (0.04% $Mn^{+3}$ by weight total monomer feed), and (3) 32 ml. per minute of an aqueous solution consisting of 1 part by weight water, 0.04 part by weight Igepal CO-970 (trademark) emulsifier, a nonylphenoxypoly(ethyleneoxy)ethanol emulsifier sold by General Aniline & Film Corp., 0.03 part by weight Alipal CO-433 (trademark) emulsifier, a 28% by weight solution of sodium salt of a sulfate ester of an alkylphenoxypoly(ethyleneoxy)ethanol sold by General Aniline and Film Corp., 0.01 part by weight sodium bisulfite, the whole being brought to pH 5.5 by addition of aqueous disodium hydrogen phosphate (molar ratio $NaHSO_3:Mn^{+3}$ of about 11:1).

The temperature of polymerization was 40° C. and a period of about 3½ hours was allowed for equilibrium conditions to be reached prior to emulsion sampling. The reaction proceeded smoothly. Residual butyl acrylate monomer content in the product copolymer emulsion was 0.88% by weight of emulsion, the total solids content was 45.2% by weight, and the pH was 5.4. The measured ethylene conversion was over 95%; thus, the apparent (calculated) ethylene content of the n-butyl acrylate/ethylene copolymer was about 7.5% by weight.

The foregoing reaction carried out using tert.-butyl hydroperoxide-sodium bisulfite initiator, instead of the manganic ion-sodium bisulfite redox according to the present improvement, gave a very poor polymerization reaction.

EXAMPLE 15

This example used the continuous process as described in Examples 1-11 and 14, incorporating the improvement of the present invention for emulsion copolymerization of vinyl chloride and ethylene. A product copolymer was obtained which had about 20% by weight of ethylene (as determined by infrared spectroscopy) incorporated therein.

Numerous other modifications of the various expedients described can be made without departing from the scope of the invention which is defined in the following claims.

What is claimed is:

1. In the redox-initiated low pressure aqueous emulsion interpolymerization of ethylene with other vinyl monomer wherein product interpolymer is to contain up to 1 mole of ethylene per mole other vinyl monomer, the improvement which comprises using as redox polymerization initiator system manganic ion as oxidizing component thereof and a member of the group of alkali metal bisulfites and metabisulfites as reducing component thereof, said manganic ion being maintained in solution during the aqueous emulsion interpolymerization by the presence of a water soluble pyrophosphate complexing or sequestering agent, and carrying out the polymerization at a temperature between about 0° C. and 45° C. at a pH of about 3 to 7.

2. The improvement in a process as claimed in claim 1 wherein the interpolymerization is carried out under a pressure in the range of about 100-500 p.s.i.g.

3. The improvement in a process as claimed in claim 1 wherein the temperature of polymerization is 15 to 35° C.

4. The improvement in a process as claimed in claim 3 wherein the temperature of polymerization is about 20° C.

5. The improvement in a process as claimed in claim 1 wherein the pH is within the range of about 5.5 to 6.5.

6. The improvement in a process as claimed in claim 1 wherein sodium pyrophosphate is present as complexing agent for the manganic ion.

7. The improvement in a process as claimed in claim 6 wherein the sodium pyrophosphate is present in sufficient excess of that required to complex the manganic ion to thereby additionally act as buffer to maintain pH in the required range.

8. The improvement in a process as claimed in claim 1 wherein the manganic ion is present in an amount of 0.01 to 0.2% by weight of total monomers.

9. The improvement in a process as claimed in claim 8 wherein the reducing component of the redox initiator is used in a molar ratio to manganic ion of about 4 or 5:1.

10. The improvement in a process as claimed in claim 1 wherein the interpolymerization is carried out continuously.

11. The improvement in a process as claimed in claim 1 wherein the other vinyl monomer consists of one or more of the group of vinyl esters, alkyl acrylates and methacrylates, styrene and α-substituted styrenes, acrylonitrile and vinyl chloride.

12. The improvement in a process as claimed in claim 11 wherein the monomer is vinyl acetate.

13. The improvement in a process as claimed in claim 11 wherein the monomer is butyl acrylate.

14. The improvement in a process as claimed in claim 11 wherein the monomer is vinyl chloride.

15. The improvement in a process as claimed in claim 1 wherein a minor amount of an interpolymerizable modifying vinyl monomer in addition to ethylene is included in the interpolymerization.

16. The improvement in a process as claimed in claim 15 wherein the modifying monomer is diacetone acrylamide.

17. The improvement in a process as claimed in claim 15 wherein the modifying monomer is an alpha-olefin higher than ethylene.

18. The improvement in a process as claimed in claim 1 wherein the interpolymerization is carried out in a batch operation.

19. The improvement in a process as claimed in claim 18 wherein the manganic ion oxidizing component of the redox polymerization initiator is added by delayed addition throughout the polymerization reaction to a polymerization medium containing the reducing component of the redox polymerization initiator.

References Cited
UNITED STATES PATENTS

| | | | |
|---|---|---|---|
| 3,414,547 | 12/1968 | Thompson et al. | 260—78.5 |
| 3,560,454 | 2/1971 | Buning et al. | 260—78.4 |
| 3,644,528 | 2/1972 | Brown et al. | 260—591 |

LESTER L. LEE, Primary Examiner

U.S. Cl. X.R.

260—63 R, 85.5 HC, 86.7, 87.5 C, 89.7 R, 93.5 W, 94.9 A